United States Patent [19]

Marvel

[11] Patent Number: 4,859,274
[45] Date of Patent: Aug. 22, 1989

[54] PACKET-TYPE LAMINATOR

[76] Inventor: Fred D. Marvel, 1720 N. Sheridan, Tulsa, Okla. 74115

[21] Appl. No.: 191,755

[22] Filed: May 3, 1988

Related U.S. Application Data

[63] Continuation of Ser. No. 778,233, Sep. 20, 1985, abandoned.

[51] Int. Cl.$^4$ .................. B30B 15/04; B30B 15/34
[52] U.S. Cl. .................. 156/499; 100/93 RP; 100/172; 100/176; 156/555; 156/583.1
[58] Field of Search .............. 156/499, 555, 583.5, 156/583.1, 582; 100/93 P, 93 RP, 137, 140, 160, 172, 176

[56] References Cited

U.S. PATENT DOCUMENTS

| | | | |
|---|---|---|---|
| 3,290,202 | 12/1966 | Pratt | 100/93 RP |
| 3,711,355 | 4/1970 | Staats et al. | 156/499 |
| 3,770,550 | 11/1973 | Levitan | 156/498 |
| 3,943,031 | 3/1976 | Krueger et al. | 156/583.1 |
| 4,021,288 | 5/1977 | Hannon et al. | 156/583.1 |
| 4,451,320 | 5/1984 | Marvel | 156/366 |

Primary Examiner—Michael Wityshyn
Attorney, Agent, or Firm—Robert B. Stevenson

[57] ABSTRACT

A packet-type laminating machine for laminating a flat object between two sheets of protective plastic film, comprising a pair of closely spaced heating platens with a flared opening at one end designed to accept the insertion of a packet-type laminable plastic pouch and a pair of manually driven outlet compression rollers at the other end of the heating platens designed to compress and withdraw the heated laminable plastic pouch wherein all components are adapted to readily insert through openings in or drop into recesses in the tope edges of sidewalls during assembly of the laminator. Such a laminator is extremely efficient to operate and is readily assembled and repaired, leading to reduced operating, maintenance and capital investment costs.

1 Claim, 3 Drawing Sheets

PACKET-TYPE LAMINATOR

This is a continuation of copending application Ser. No. 778,233 filed on Sept. 20, 1985, now abandoned.

BACKGROUND OF THE INVENTION

1. Field of the Invention

This invention relates to an improved laminator. More specifically, the invention relates to an inexpensive packet-type laminator employing a pair of contact heating platens and a pair of compression rollers that can be readily disassembled, repaired or replaced, and then easily reassembled.

2. Description of the Prior Art:

With the advent of the packet-type laminable plastic pouch, the concept of sealing a driver's license, identification card, credit card, photograph or the like has become increasingly popular. Thus, it is generally known to place such an object within a packet between layers of thermoplastic sheet and then pass the entire pouch and contents through a small portable heat sealing laminator. After exiting the laminator, the packet is cooled and the outer protective layers are removed to recover the thermoplastic encapsulated object.

Various alternative methods have been proposed to improve laminators with varying degrees of commercial success. For example, in U.S. Pat. No. 3,711,355 a compact laminator involving an oven with spaced heating platens which do not make contact with the packet is disclosed. In contrast, U.S. Pat. No. 3,770,550 discloses a laminator that employs heating platens that not only make contact with the packet, but are also biased under pressure to squeeze the forward portion of the platens together as the packet passes through the laminator.

However, in the first case with no direct thermal contact between the heating element and the packet, heat transfer properties and thermal efficiency are not optimized, requiring unnecessary energy input at the heating stage. Similarly, if the contact heating element involves a force during laminating, drag is increased, leading to a decreased mechanical efficiency in that a larger motor is required to drive the packet between the heating platens.

In U.S. Pat. No. 4,451,320 the present inventor disclosed and claimed an improved motor driven packet-type laminator which featured an optimum balance between thermal contact and minimum drag and which could be readily and economically manufactured as well as easily disassembled, repaired and reassembled. The present invention is viewed as an improvement of the laminator disclosed in U.S. Pat. No. 4,451,320.

SUMMARY OF THE INVENTION

In view of the prior art laminators, I have discovered an improved compact and portable laminator which features an entirely manually operated system with a single set of outlet compression rollers operated by a hand crank after the laminable plastic pouch has been heated between a pair of heating platens powered by low wattage heating elements for a selected time period. Thus, the present invention provides a packet-type laminating machine comprising: a pair of vertical sidewall members adapted to rest on a lower edge during assembly wherein each of the vertical sidewall members contains a single recess along the top edge and a plurality of openings adapted to accept the following items from above and from the side during assembly and retain the items in the stated relationship to each other during the operation of the packet-type laminating machine and wherein the packet-type laminating machine further consists of the items:

(a) a pair of horizontally flat heating platens lying one on top of the other at a fixed displacement from each other with a flared opening at one end adapted to accept and heat a packet to be laminated;

(b) a single pair of vertically stacked rollers positioned behind the platens such that the nip between the rollers is coplanar with and essentially adjacent to the plane of contact between the platens and wherein at least one roller is equipped with and driven by a manual crank;

(c) at least one rigid member adapted to attach to the vertical sidewalls and hold the sidewalls essentially parallel during operation;

(d) a first spring means attached to the vertically stacked rollers such as to hold the pair of roller under compression; and (e) a second spring means attached to the pair of horizontally flat heating platens such as to hold the pair of horizontally flat heating platens in the recesses.

It is a primary object of the present invention to provide a compact, portable and manually operated laminator that is extremely inexpensive to manufacture and assemble in that it uses a minimum number of components and assembly steps with maximum interchangeability of parts. It is a further object to provide a packet-type laminator that is mechanically simple, efficient and reliable and particularly compatible with wallet-size packets. The fulfillment of these objects and the presence and fulfillment of other objects will be apparent upon complete reading of the specification and claims when taken in conjunction with the attached drawings.

DESCRIPTION OF THE PREFERRED EMBODIMENTS

Figure 1:
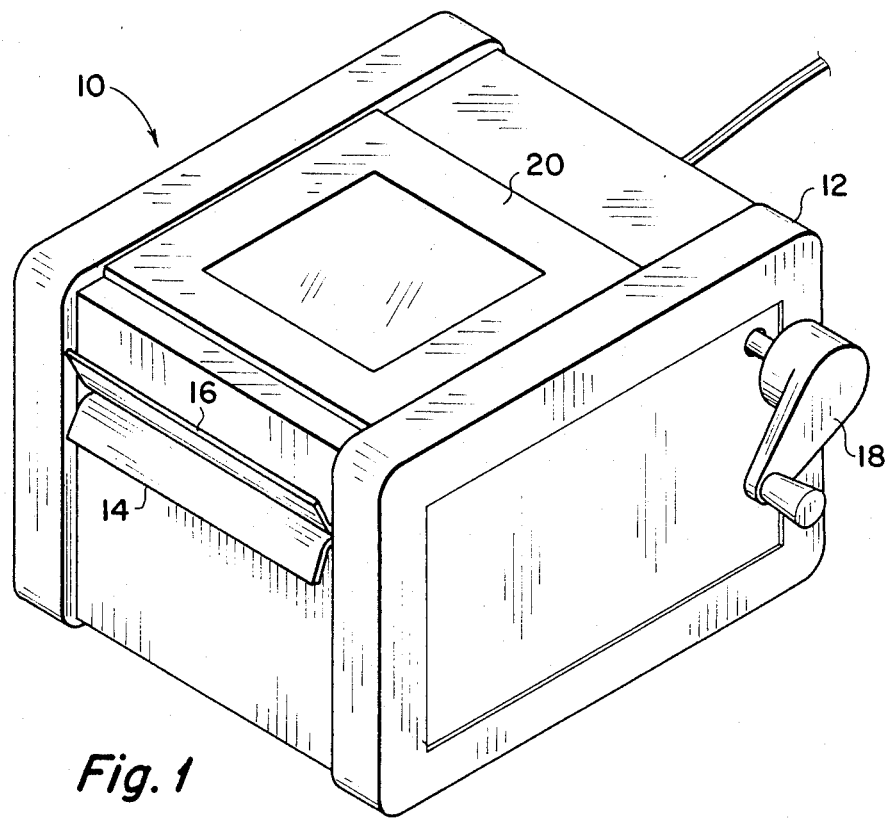
FIG. 1 is a perspective view of the improved packet-type laminating machine of the present invention enclosed in a protective decorative case.
Figure 6:
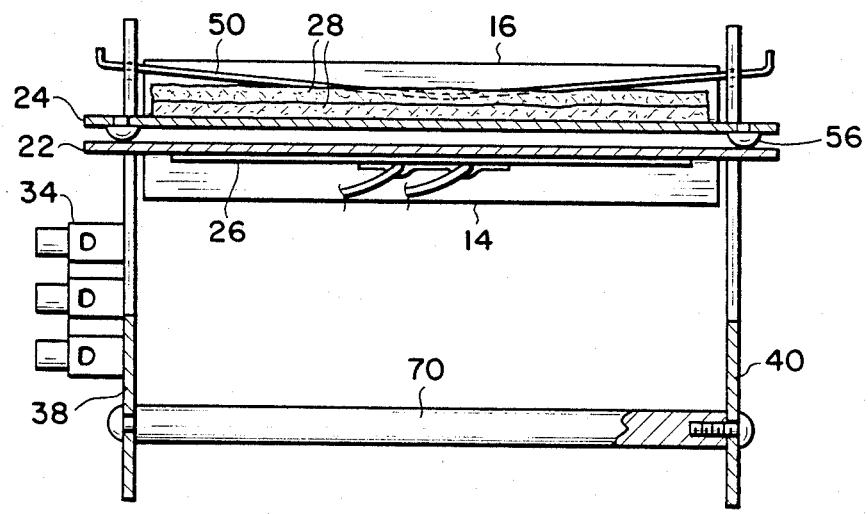
FIG. 6 is a cross-sectional view of the laminating machine of FIG. 2 as seen through line 6—6.

The improved packet-type laminating machine according to the present invention, how it functions and how it differs from previously known laminators can perhaps be best explained and understood by reference to the drawings. FIG. 1 illustrates a packet-type laminating machine of the present invention, generally designated by the numeral 10, as it appears in use and as enclosed in a housing 12 with a pair of flared ends 14 and 16 of two heating platens extending out of the housing, thus forming an inlet on the front side of the laminator 10. The flared ends 14 and 16 are designed to accept the packet with object to be laminated. On the right side of the laminator 10 is a hand crank 18 for expelling the packet out of the backside of the laminator 10 after lamination. On top of the laminator 10 is a warming tray 20 for speeding up the photo developing process when making laminated photographic ID cards or the like.

From the exposed views of the laminating machine without the housing as illustrated in FIGS. 2 through 6, the relative position of the previously mentioned components can be seen in greater detail. Positioned at the front of the laminator are the two flared ends 14 and 16 of a pair of flat, closely spaced, heating platens 22 and 24. The lower side of platen 22 has a heating element 26 adhesively attached, while the top of the upper heating platen 24 is covered, in this embodiment, by two layers of insulation 28. The lower heating platen 22 also has attached to the underside a stacked electrical terminal 30 with external leads 32 and 34. Preferably, the leads 32 and 34 are attached to connector 36 which in turn is connected to a grounded three wire cable and conventional electrical plug (not shown) that exits the housing of the laminator 10 such as to plug into a conventional 110 volt receptacle.

Figure 3:
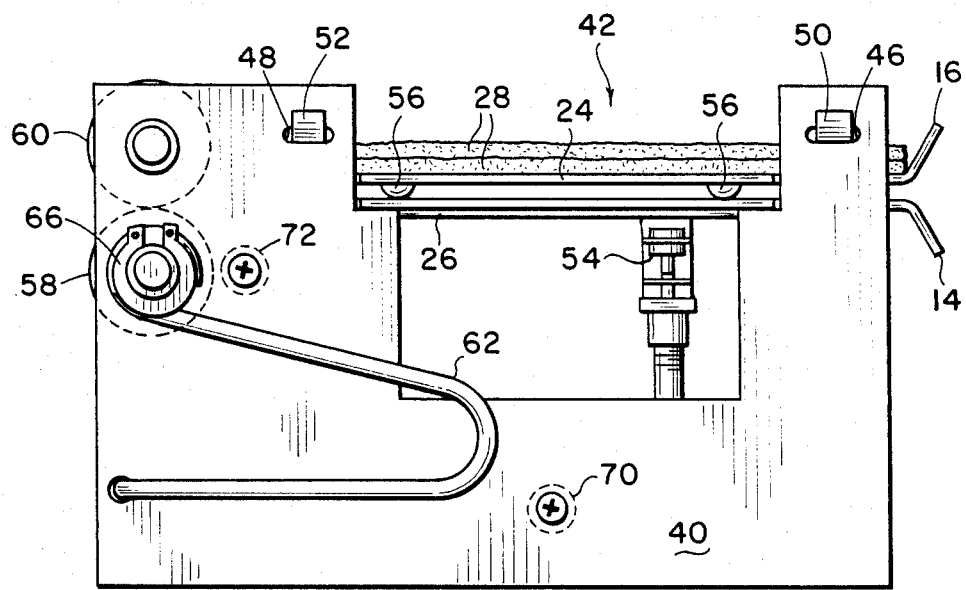
FIG. 3 is a left side elevational view of the improved packet-type laminating machine of FIG. 1 again with the case removed.
Figure 2:
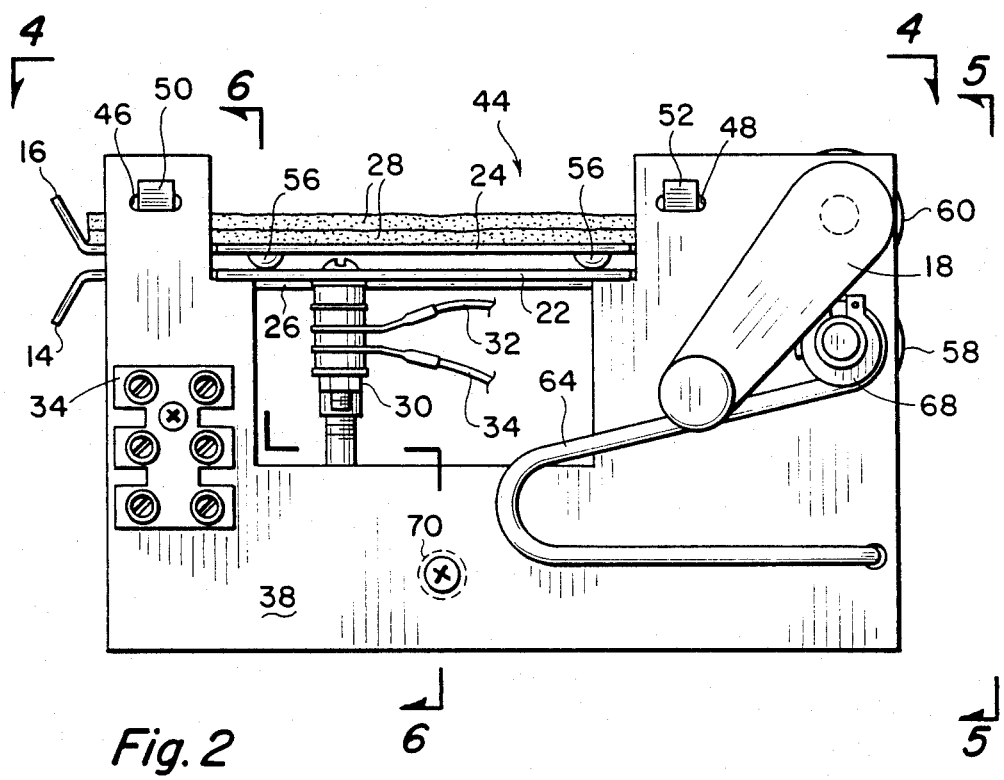
FIG. 2 is a right side elevational view of the improved packet-type laminating machine of FIG. 1 with the decorative case removed.
Figure 4:
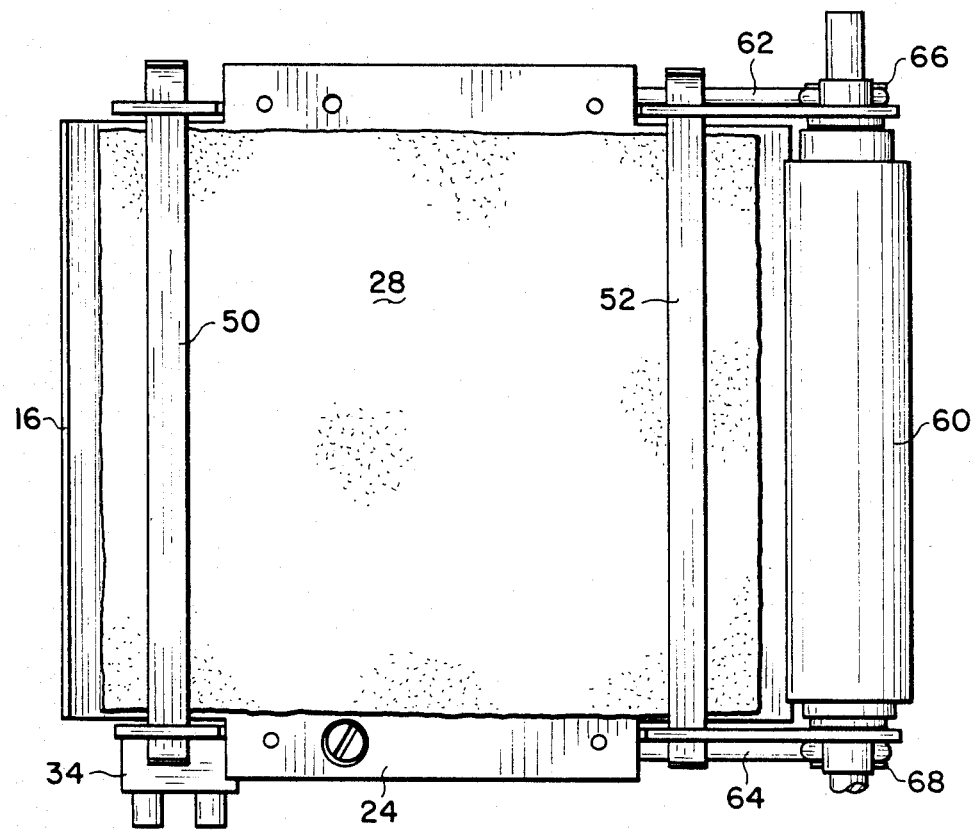
FIG. 4 is a top plan view of the laminating machine of FIG. 2 as seen through line 4—4.
Figure 5:
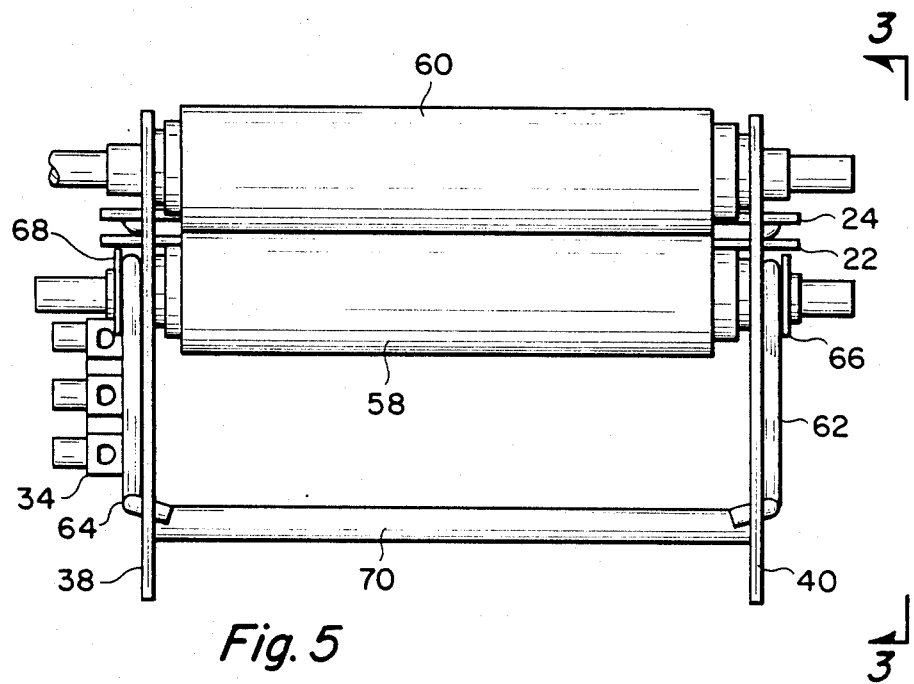
FIG. 5 is a rear elevational view of the laminating machine of FIG. 2 as seen through line 5—5.

As can further be seen in FIGS. 2 and 3, both sidewalls 38 and 40 have a stair-step recess 42 and 44 on the top edge to accept and retain the heating platens 22 and 24. Each sidewall is further equipped with openings 46 and 48 which accept and hold leaf springs 50 and 52 (see FIGS. 4 and 5) which in turn apply a gentle pressure downward on the heating platen assembly, thus retaining the platens in the recess of the sidewalls during use. As further seen in FIG. 3, on the inner side of terminal 30 is a set of adjustable bimetallic breaker points 54 connected in series (not shown) to one of the leads of the heating element 26 such as to regulate the temperature of the heating platens. It should be further noted that the platens 22 and 24 are permanently spaced- a fixed distance apart by spacers 56 such that the flared opening and heating platens will accept the packet to be laminated.

At the far end of the heating platens 22 and 24 is a pair of vertically stacked outlet rollers 58 and 60. The axle of each roller with sleeve bearings passes through appropriately positioned and sized openings in the sidewalls such that the nip between the rollers 58 and 60 is essentially coplanar with the fixed spacing between the heating platens 22 and 24. The axle of the lower roller extending beyond the sidewalls is equipped with springs 62 and 64 and snap rings 66 and 68. The openings in the sidewalls for the axle of the lower roller 58 is somewhat elongated in the vertical direction (not shown) such as to allow displacement of the lower roller as the packet being laminated passes through the nip between the rollers. In this manner, the springs 62 and 64 can exert a compressive force on the packet, yet yield to allow for its passage through the laminator. The axle of the upper roller has the manual crank 18 attached thereto. In this manner, the packet to be laminated can be extracted from the heating platens by gently pushing it into the nip while simultaneously turning the crank 18. As further illustrated, the sidewalls 38 and 40 and thus the laminator as a whole is held together by a pair of cross support members 70 and 72 attached to the sidewalls.

One of the advantages and novel features of the present invention is the ease and simplicity of assembling the laminator. Initially the rollers with sleeve bearings are mounted through the openings in the sidewall pieces. The rigid cross members are then securely fastened to the respective sidewalls resulting in the sidewalls standing vertically parallel to each other when resting on their lower edges. The stacked pair of platens with thermostat and heating pads already attached, can be easily dropped into place from above. The two compression springs and two leaf springs essentially snap into place. The electric leads and terminal of the heating platens thread through the slot or opening in the sidewall during assembly, thus allowing the electrical terminal to be attached to the sidewall connector, essentially completing the assembly of the laminator illustrated in the figures. In a similar manner, the device can be readily disassembled, repaired, and reassembled at minimum cost.

An additional advantage associated with the present laminating machine is that it is readily adaptable to the extensive use of interchangeable parts, thus reducing manufacturing and repair costs. For example, both rollers can be identical and interchangeable as can both leaf springs and roller compression springs. Also, both sidewalls can be identical and interchangeable.

Still another advantage of the improved packet-type laminating machine of the present invention is that the combination of minimizing drag, fixing the distance between the heating platens and virtually all compression occurring at the nip of the rollers results in optimum heat and mechanical efficiency at minimum capital investment.

The specific selection of materials and choice of components to be employed can be readily made from material and parts generally available in the art. Preferably, the roller surfaces are of high temperature silicon rubber and the roller axles are filled with metallic sleeve bearings. The remainder of the machine can be made of any convenient metal and preferably involves inexpensive stamping to manufacture the respective components.

Since the assembled unit as disclosed in the drawing has its own structural integrity, the housing to encase the machine can be merely protective in nature and thus made of metal or plastic of sufficient thermal integrity to withstand the heating inherently occurring during lamination. Preferably, the housing is molded of a highly thermal resistant grade of thermoplastic or fiber reinforced plastic.

Having thus described the preferred embodiments of the invention with a certain degree of particularity, it is manifest that many changes can be made in the details of the construction and the arrangement of components without departing from the spirit and scope of this disclosure. Therefore, it is to be understood that the invention is not limited to the embodiments set forth herein for purposes of exemplification, but is to be limited only by the scope of the attached claims including a full range of equivalents to which each element thereof is entitled.

I claim:

1. A packet-type laminating machine and packet comprising, in combination, a pair of vertical sidewall members adapted to ret on a lower edge during assembly wherein each of said vertical sidewall members contains a single recess along the top edge and a plurality of openings adapted to accept the following items from above and from the side during assembly and retain said items in the stated relationship to each other during the operation of said packet-type laminating machine and wherein said packet-type laminating machine and packet further consist of said items:

(a) a pair of horizontally flat heating platens lying one on top of the other at a fixed minimum displacement from each other with a flared opening at one end adapted to accept and heat a packet to be laminated wherein said platens are permanently spaced a fixed minimum distance apart during use such as to accept a packet having a thickness less than said fixed minimum distance such as to be laminated with minimum drag and allow virtually all compression to occur at the nip of rollers;

(b) a single pair of vertically stacked rollers positioned behind said platens such that a nip between said rollers is coplanar with and essentially adjacent to a plane between said platens and wherein at least one roller is equipped with and driven by a manual crank;

(c) at least one rigid member adapted to attach to said vertical sidewalls and hold said sidewalls essentially parallel during operation;

(d) a first spring means attached to said vertically stacked rollers such as to hold said pair of rollers under compression;

(e) a second spring means attached to said pair of horizontally flat heating platens such as to hold said pair of horizontally flat heating platens in said recesses; and (f) a packet to be laminated, wherein said packet thickness is less than said fixed minimum distance said platens are permanently spaced apart during use.

* * * * *